US012280392B2

(12) United States Patent
Li

(10) Patent No.: US 12,280,392 B2
(45) Date of Patent: *Apr. 22, 2025

(54) GLUE GUN

(71) Applicants: HANGZHOU UNITED TOOLS CO., LTD., Hangzhou (CN); HANGZHOU GREAT STAR INDUSTRIAL CO., LTD., Hangzhou (CN)

(72) Inventor: Yueming Li, Hangzhou (CN)

(73) Assignees: HANGZHOU UNITED TOOLS CO., LTD., Hangzhou (CN); HANGZHOU GREAT STAR INDUSTRIAL CO., LTD., Hangzhou (CN)

( * ) Notice: Subject to any disclaimer, the term of this patent is extended or adjusted under 35 U.S.C. 154(b) by 385 days.

This patent is subject to a terminal disclaimer.

(21) Appl. No.: 17/843,646

(22) Filed: Jun. 17, 2022

(65) Prior Publication Data

US 2022/0314270 A1 Oct. 6, 2022

Related U.S. Application Data

(63) Continuation-in-part of application No. 16/627,142, filed as application No. PCT/CN2019/070422 on Jan. 4, 2019, now Pat. No. 11,364,519.

(51) Int. Cl.
*B05C 17/01* (2006.01)

(52) U.S. Cl.
CPC .................................... *B05C 17/01* (2013.01)

(58) Field of Classification Search
CPC .................................................. B05C 17/0126

(Continued)

(56) References Cited

U.S. PATENT DOCUMENTS 4,339,058 A * 7/1982 Wendt ...................... B05C 17/01 222/326
5,197,635 A * 3/1993 Chang ............... B05C 17/00553 222/391

(Continued)

FOREIGN PATENT DOCUMENTS

CN 2824692 Y 10/2006
CN 101099961 A 1/2008

(Continued)

OTHER PUBLICATIONS

CNIPA; Chinese Office Action from Chinese Application No. 202320373452.9; Jan. 19, 2024; In Chinese with English Machine Translation (4 pages).

*Primary Examiner* — Jeremy Carroll
(74) *Attorney, Agent, or Firm* — FITCH, EVEN, TABIN & FLANNERY LLP

(57) ABSTRACT

A glue gun includes a first handle and a second handle which are connected via a pivot pin shaft, and one of them is arranged as a fixed handle, and the other is arranged as a movable handle. The movable handle is provided with an actuating member configured to push a push member. A spacing between the actuating member and the pivot pin shaft is adjustable, such that the pivot pin shaft or the actuating member can switch between at least two gears and the ratio of a spacing between the pivot pin shaft and a force application point on the movable handle to a spacing between the pivot pin shaft and a force bearing point on the actuating member is changed, thus enabling a change in the force applied on the push member as well as a change in the rate of movement of a push rod.

20 Claims, 12 Drawing Sheets

(58) Field of Classification Search
USPC .......................................................... 222/391
See application file for complete search history.

(56) References Cited

U.S. PATENT DOCUMENTS

| | | | | |
|---|---|---|---|---|
| 6,056,156 | A | 5/2000 | Peng | |
| 6,640,998 | B1 * | 11/2003 | Kern .................. | B05C 17/0126 222/391 |
| 2002/0092871 | A1 * | 7/2002 | Rickard ............. | A61B 17/8822 222/391 |
| 2009/0134187 | A1 * | 5/2009 | Hefele ................ | B05C 17/0126 222/391 |
| 2012/0145749 | A1 * | 6/2012 | Hung .................. | B05C 17/0123 222/391 |
| 2017/0348724 | A1 * | 12/2017 | Hung .................. | B05C 17/0126 |
| 2019/0299244 | A1 * | 10/2019 | Xia ..................... | B05C 17/0123 |

FOREIGN PATENT DOCUMENTS

| | | | |
|---|---|---|---|
| CN | 101444772 | A | 6/2009 |
| CN | 202062389 | U | 12/2011 |
| CN | 107116010 | A | 9/2017 |
| CN | 207138230 | U | 3/2018 |
| CN | 108580210 | A | 9/2018 |
| CN | 210079978 | U | 2/2020 |
| CN | 217963341 | U | 12/2022 |
| EP | 0736333 | A2 | 10/1996 |
| KR | 20100030529 | A | 3/2010 |

* cited by examiner

GLUE GUN

FIELD OF THE INVENTION

The present invention relates to the field of hardware, and in particular to a glue gun, which belongs to the technical field of tools for use in production, processing, manufacturing and construction industries.

DESCRIPTION OF THE PRIOR ART

During the use of a glue gun, glue is pushed by a gun-type handle lever, which continuously reciprocates to squeeze the glue such that same is discharged. One end of the glue gun is provided with a trigger mechanism suitable for a user to hold and press. As the user manually presses the trigger mechanism, the glue placed in the glue gun can be driven by a mechanical structure of the glue gun such that the glue is discharged at a glue outlet of a glue barrel. One glue gun can be adapted to various types of glue with different characteristics, and different glue has different fluidity. A common glue gun only has a fixed squeezing mechanism, so it is very difficult to achieve uniform glue discharge in the process of glue application. In specific application scenarios of the glue gun, different glue discharge speeds are required owing to different ranges of glue application. However, the common glue gun only has the fixed squeezing mechanism, so the glue discharge speed of the glue barrel can be controlled only by means of the pressing speed of the user's hand. In fact, it is extremely difficult to control the pressing speed of the user's hand while applying a force, especially when applying a large force to the handle. In the process of starting to use the glue gun, usually, since same is left unused for a long time, some of the glue is solidified, and the static viscosity of the glue and other problems exist, a relatively large force is usually required to drive the glue gun in the beginning of using same, and after the glue discharge is stabilized, the driving force required by the glue gun will be significantly reduced. The fixed squeezing mechanism of the common glue gun cannot solve these problems. In addition, in order to discharge the glue, same is usually squeezed hard in the beginning of using the glue gun, but the squeezing speed is difficult to control, so there is the problem of glue waste caused by excessive extrusion after the glue is squeezed out.

Therefore, a person skilled in the art is dedicated to developing a glue gun, in which the gear can be adjusted to enable switching between a fast feed and a powerful feed, thereby enabling the user to make adjustment according to actual requirements.

SUMMARY OF THE INVENTION

In view of the above defects in the prior art, the technical problem to be solved by the present invention is how to make gears of the glue gun adjustable.

In order to achieve the above-mentioned object, the present invention provides a glue gun, where the glue gun includes a movable handle and a fixed handle, and the movable handle is connected to fixed handle via a pivot pin shaft; the movable handle is further provided with an actuating member, and the actuating member is provided with an actuating part cooperating with a push member; and a spacing between the pivot pin shaft and the actuating part is sized to be switchable between two or more gears, such that the magnitude of the force applied by the actuating member on the push member is changed.

Further, the movable handle is provided with a sliding groove, which is provided with two or more gears; and the pivot pin shaft is arranged to be slidable in the sliding groove so as to enable switching between the gears.

Further, the fixed handle is provided with a sliding groove, which is provided with two or more gears; and the pivot pin shaft is arranged to be slidable in the sliding groove so as to enable switching between the gears.

Further, an elastic component is further provided between the movable handle and the fixed handle; and the elastic component is arranged to produce a pre-tightening force on the movable handle so as to keep the pivot pin shaft in one of the gears.

Further, the pivot pin shaft is a stepped pin shaft having a pressing end, the pressing end is sheathed with an elastic component, the stepped pin shaft has a first shaft diameter portion and a second shaft diameter portion, the shaft diameter of the first shaft diameter portion is greater than the width of the sliding groove, the shaft diameter of the second shaft diameter portion is smaller than the width of the sliding groove, and the stepped pin shaft is arranged such that: under the biasing action of the elastic component, the first shaft diameter portion is in the gear; when the pressing end is pressed, the stepped pin shaft moves axially such that the second shaft diameter portion goes into the gear; and when the pressing end is released, the stepped pin shaft moves axially in the opposite direction under the action of a restoring force of the elastic component such that the first shaft diameter portion goes into the gear again.

Further, the sliding groove is an arc-shaped groove or a linear groove.

Further, the movable handle is provided with a sliding groove, which is provided with two or more gears; and the actuating part is arranged to be slidable in the sliding groove so as to enable switching between the gears.

Further, the actuating member further includes a pivot, and the actuating part of the actuating member is arranged to be slidable in the sliding groove around the pivot.

Further, a brake is sheathed on a push rod, one end of the brake cooperates with a limiting groove of a main body, and the one end of the brake moves between a first limiting end and a second limiting end of the limiting groove, so that the push rod has an idle stroke, with a distance from the first limiting end to the second limiting end, in the pushing process.

Further, the idle stroke is 3-5 mm.

In order to achieve the above object, the present invention further provides a glue gun, including:

- a first handle and a second handle, where the first handle is connected to the second handle via a pivot pin shaft; one of the first handle and the second handle is arranged as a fixed handle, and the other is arranged as a movable handle rotating relative to the fixed handle;
- the movable handle is provided with an actuating member, and the actuating member is configured to push a push member of the glue gun; and
- at least one of the actuating member and the pivot pin shaft is arranged to be adjustable in position so as to switch between at least two gears, so that the ratio of a spacing between the pivot pin shaft and a force application point on the movable handle to a spacing between the pivot pin shaft and a force bearing point on the actuating member is changed, thus enabling a change in the force applied on the push member as well as a change in the rate of movement of a push rod.

Further, a spacing between the axis of the actuating member and the axis of the pivot pin shaft is sized to be adjustable, such that the pivot pin shaft or the actuating member can switch between the at least two gears.

Further, one of the first handle and the second handle is provided with a sliding groove, which is provided with the at least two gears; and the pivot pin shaft is arranged to be slidable in the sliding groove so as to enable switching between the gears.

Further, an elastic component is further provided between the first handle and the second handle; and the elastic component is arranged to produce a pre-tightening force on one of the first handle and the second handle which is arranged as the movable handle so as to keep the pivot pin shaft in one of the gears.

Further, the pivot pin shaft is a stepped pin shaft, the stepped pin shaft has a first shaft diameter portion and a second shaft diameter portion, the widths of the sliding groove at the gears are greater than the width of a communication portion of the sliding groove which communicates the gears; the shaft diameter of the first shaft diameter portion is greater than the width of the communication portion, and the shaft diameter of the second shaft diameter portion is smaller than the width of the communication portion; and the stepped pin shaft is configured such that: the stepped pin shaft moves axially under the action of an external force, and when the first shaft diameter portion is in any of the gears, the stepped pin shaft is kept in the gear, and when the second shaft diameter portion is in the gear, the stepped pin shaft can slide along the sliding groove.

Further, the stepped pin shaft has a pressing end, the pressing end is sheathed with an elastic component, and the stepped pin shaft is configured such that: under the biasing action of the elastic component, the first shaft diameter portion is in the gear; when the pressing end is pressed, the stepped pin shaft moves axially such that the second shaft diameter portion goes into the gear; and when the pressing end is released, the stepped pin shaft moves axially in the opposite direction under the action of a restoring force of the elastic component such that the first shaft diameter portion goes into the gear again.

Further, one end of the stepped pin shaft is connected to a pressing portion, the pressing portion is provided with at least one positioning pin, and the axial direction of the positioning pin is parallel to the axial direction of the stepped pin shaft; the sliding groove is provided on the first handle, the second handle is provided with at least one positioning groove, and the positioning pin passes through the positioning groove and is configured to slide in the positioning groove; the positioning pin is sheathed with an elastic component, where the stepped pin shaft and the positioning pin are configured to move along with the pressing portion, and under the biasing action of the elastic component, the first shaft diameter portion is in the gear; when the pressing portion is pressed, the stepped pin shaft and the positioning pin move axially such that the second shaft diameter portion goes into the gear; and when the pressing end is released, the positioning pin and the stepped pin shaft move axially in the opposite direction under the action of a restoring force of the elastic component such that the first shaft diameter portion goes into the gear again.

Further, the glue gun further includes a blocking piece arranged opposite the pressing portion, and the other ends of the stepped pin shaft and the positioning pin are connected to the blocking piece by fasteners.

Further, the pressing portion is provided with a first positioning pin and a second positioning pin, and the second handle is provided with a first positioning groove corresponding to the first positioning pin and a second positioning groove corresponding to the second positioning pin.

Further, the first positioning pin, the second positioning pin and the stepped pin shaft are distributed in a triangle shape.

Further, the first positioning pin and the second positioning pin are on a same straight line.

Further, a boss is provided on an outer surface of the pressing portion.

Further, the sliding groove is an arc-shaped groove or a linear groove.

Further, the first handle is provided with a sliding groove, which is provided with the at least two gears; and the actuating part is arranged to be slidable in the sliding groove so as to enable switching between the gears.

Further, the actuating member further includes a pivot, and the actuating part on the actuating member is arranged to be slidable in the sliding groove around the pivot.

Further, the glue gun further includes:

a brake sheathed on a push rod of the glue gun, where a compression spring is provided between the brake and a main body of the glue gun, and the brake is configured to retain the push rod under the push of the compression spring, so that the push rod can only move in the direction of glue flowing out.

Further, the main body is provided with a limiting groove, and one end of the brake is positioned in the limiting groove; and the limiting groove has a first limiting end and a second limiting end, and the brake is configured to move between the first limiting end and the second limiting end, so that the push rod has an idle stroke, with a distance being that from the first limiting end to the second limiting end, in a pushing process.

Further, the idle stroke is 3-5 mm.

In order to achieve the above object, the present application further provides a glue gun, including:

a trigger device including a movable handle and a fixed handle which are connected via a pivot pin shaft;

a main body with one end formed as an accommodation part for accommodating glue and the other end connected to the fixed handle;

a push rod with one end provided with a push body positioned in the accommodation part and the other end sheathed with a push member, where the push body is arranged to reciprocate along with the push rod;

an actuating member provided on the movable handle and configured to push the push member; and a brake sheathed on the push rod, where a compression spring is provided between the brake and the main body, and the brake is configured to retain the push rod under the push of the compression spring, so that the push rod can only move in the direction of the glue flowing out, where a spacing between the actuating member and the pivot pin shaft is sized to be adjustable to make the glue gun switch between at least two gears, so that the ratio of a spacing between the pivot pin shaft and a force application point on the movable handle to a spacing between the pivot pin shaft and a force bearing point on the actuating member is changed, thus enabling a change in the force applied on the push member as well as a change in the rate of movement of the push rod.

Further, the movable handle has a sliding groove, and the sliding groove has a first gear and a second gear; the actuating member is configured to slide in the sliding groove so as to switch between the first gear and the second gear;

or the pivot pin shaft is configured to slide in the sliding groove so as to switch between the first gear and the second gear.

Compared with the prior art, the beneficial effects of the present invention are as follows: 1) when the pivot pin shaft is close to the actuating part, the force of the actuating part acting on the push member is increased, which is suitable for glue with a poor fluidity; and when the pivot pin shaft is far away from the actuating part, the force of the actuating part acting on the push member is reduced, which is suitable for glue with a good fluidity; 2) the arrangement of the elastic component between the movable handle and the fixed handle can prevent the pivot pin shaft from automatically jump to other gears when a gripping force is applied on the movable handle, playing the role of fixing the gear; 3) under the biasing action of the elastic component, the stepped pin shaft can be pressed to easily realize multi-gear shifting; 4) the gear can be adjusted to enable switching between a fast feed and a powerful feed, thereby enabling the user to make adjustment according to actual requirements; and 5) the idle stroke is set such that the internal stress of the glue in a glue barrel is released, thereby preventing the glue from flowing out of a glue outlet.

The concept, specific structure and resulting technical effect of the present invention are further described below in conjunction with the drawings to fully understand the object, features and effects of the present invention.

DETAILED DESCRIPTION OF THE PREFERRED EMBODIMENTS

Figure 1:
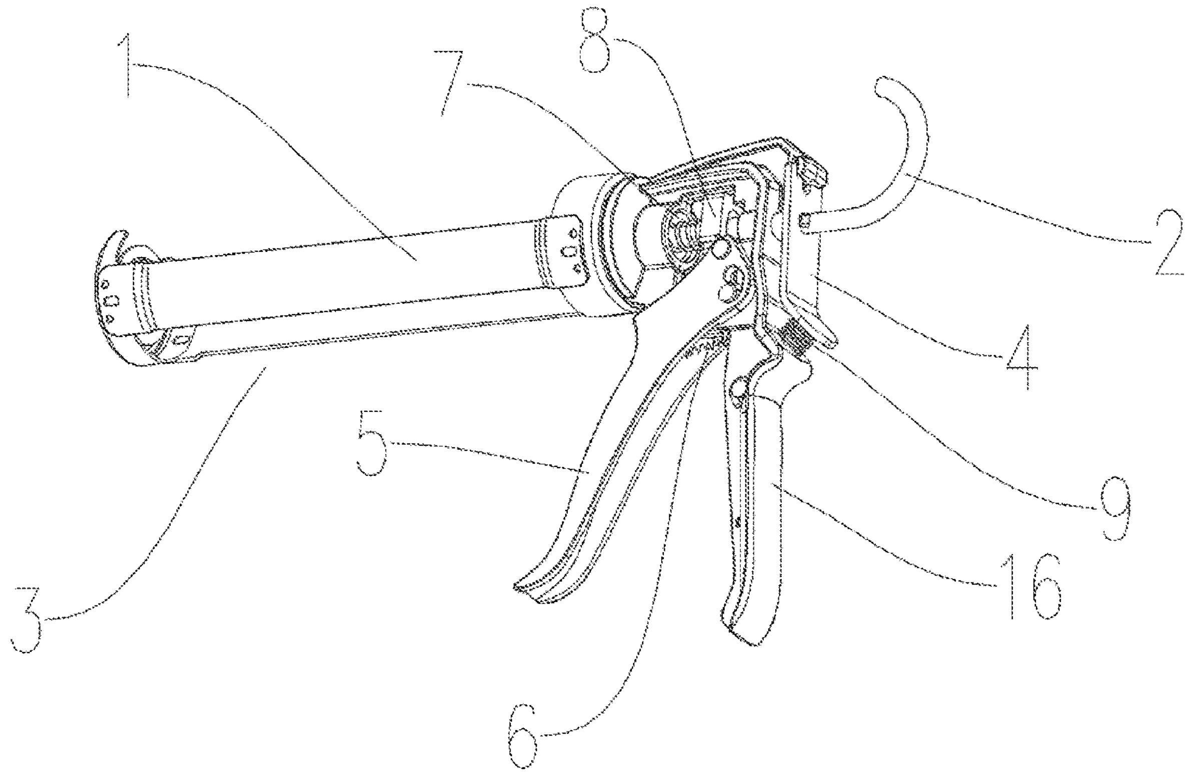
FIG. 1 is a schematic diagram showing the structure of a glue gun according to Embodiment 1 of the present invention.

Preferred embodiments of the present invention are described below with reference to the drawings of the description to make the technical contents clearer and easier to understand. The present invention can be embodied in various forms of embodiments, and the scope of protection of the present invention is not limited to the embodiments mentioned herein.

In the drawings, the same reference numeral indicates components having the same structure, and similar reference numerals indicate assemblies having similar structures or functions throughout. The size and thickness of each assembly shown in the figures are shown arbitrarily, and the present invention does not define the size and thickness of each assembly. In order to make the illustration clearer, the thickness of the component in some places of the figures is appropriately exaggerated.

Embodiment 1

Figure 2:
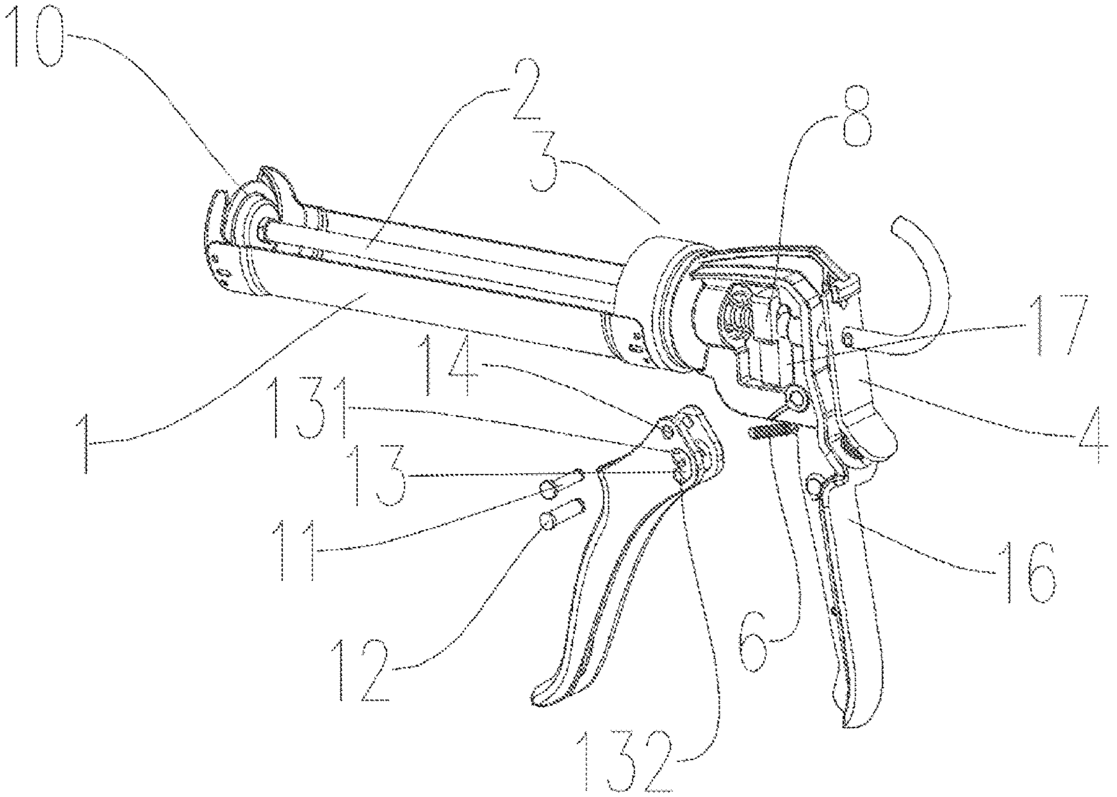
FIG. 2 is an exploded schematic diagram showing a partial structure of the glue gun in FIG. 1.

FIGS. 1-4 show a preferred embodiment of the present invention, and as shown in FIGS. 1 and 2, a glue gun of this embodiment includes a push device, a main body 3 and a trigger device. An accommodation part 1 is formed at one end of the main body 3, and the accommodation part 1 is arranged in the shape of a cylinder so as to accommodate a glue cylinder. The other end of the main body 3 and the trigger device are hinged via a fastener or are integrally formed to form a gun-shaped fixed handle 16.

The push device includes a push member 8, a push rod 2 and a push body 10. A first end of the push rod 2 is arranged in the accommodation part 1, and the push body 10 is fixed to an end portion of the first end of the push rod 2 and can reciprocate along with the push rod 2. A second end of the push rod 2 is sheathed with the push member 8, and a restoring spring 7 is also provided between the push member 8 and the main body 3. The trigger device pushes the push member 8 such that the push rod 2 moves in the direction of the push body 10, and the restoring spring 7 restores the push rod 8. The push rod 2 is also provided with a brake 4, and a compression spring 9 is provided between the brake 4 and the main body 3. The brake 4 retains the push rod 2 under the push of the compression spring 9, so that the push rod 2 can only move in the direction of the push body 10. When the glue cylinder needs to be installed, the brake 4 is pressed to release the push rod 2, so as to adjust the position of the push rod 2. The brake 4 cooperates with a limiting groove 31 of the main body 3, and one end of the brake 4 moves between a first limiting end 32 and a second limiting end 33 of the limiting groove 31. When the glue is being fed, the brake 4 moves from the second limiting end 33 to the first limiting end 32. At this time, the push rod 2 is pushed towards the glue barrel by an idle stroke, which is the distance between the first limiting end 32 and the second limiting end 33, and preferably, the distance of the idle stroke is 3-5 mm. When the glue feeding is finished, a movable handle 5 is released, the brake 4 then moves from the first limiting end to the second limiting end so as to release the force from the movable handle 5 to the push rod 2, so that the internal stress of the glue inside the glue barrel is released, thereby preventing the glue from flowing out of a glue outlet.

The trigger device includes the movable handle 5 and the fixed handle 16. The movable handle 5 is connected to the fixed handle 16 via a pivot pin shaft 12. The movable handle 5 is further provided with an actuating member 11, and the actuating member 11 passes through a hole 14 in the movable handle 5 and makes contact with the push member 8. The movable handle 5 is provided with a sliding groove 13, and the sliding groove 13 is of an arc-shaped structure and has two gears, that is, a first gear 131 and a second gear 132. The first gear 131 and the second gear 132 may be respectively located at two end portions of the sliding groove 13, and the widths of the sliding groove 13 at the first gear 131 and the second gear 132 are greater than the width of other part of the sliding groove 13. The pivot pin shaft 12 can slide in the sliding groove 13. When the pivot pin shaft 12 slides to a position of the first gear 131 of the sliding groove 13, a tension spring 6 is provided between the movable handle 5 and the fixed handle 16. One end of the tension spring 6 is connected to a tension spring groove 15 of the movable handle 5 and the other end is connected to the fixed handle 16. The tension spring 6 produces a pre-tightening force on the movable handle 5 so as to keep the pivot pin shaft 12 in one of the gears. When a gripping force is applied to the movable handle 5, the pivot pin shaft 11 pushes a pushing surface 17 of the push member 8 to move the push rod 2. When the applied force is removed, the brake 4 locks the push rod 2, and under the action of the restoring spring 7, the push member 8 slides and restores to an initial position relative to the main body 3, so that the next cycle can be carried out.

Figure 3:
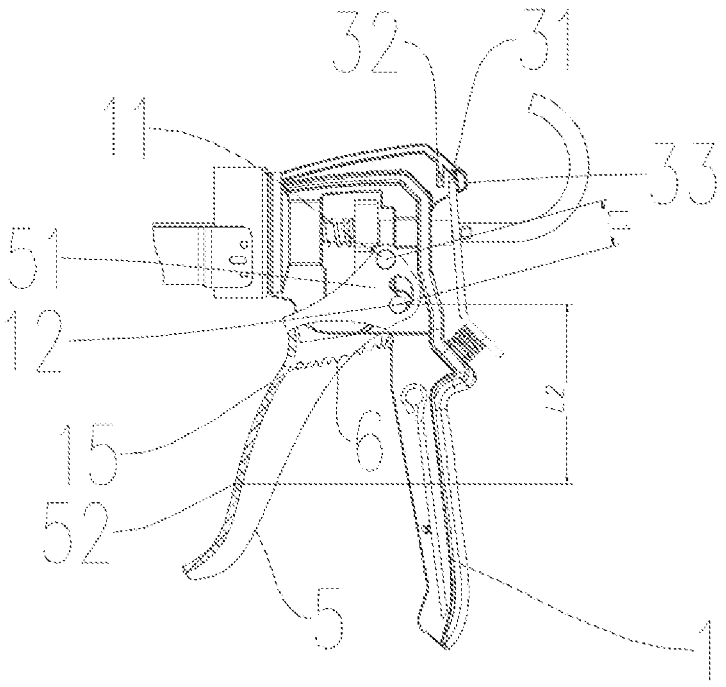
FIG. 3 is a schematic diagram of a first gear in FIG. 1.
Figure 4:
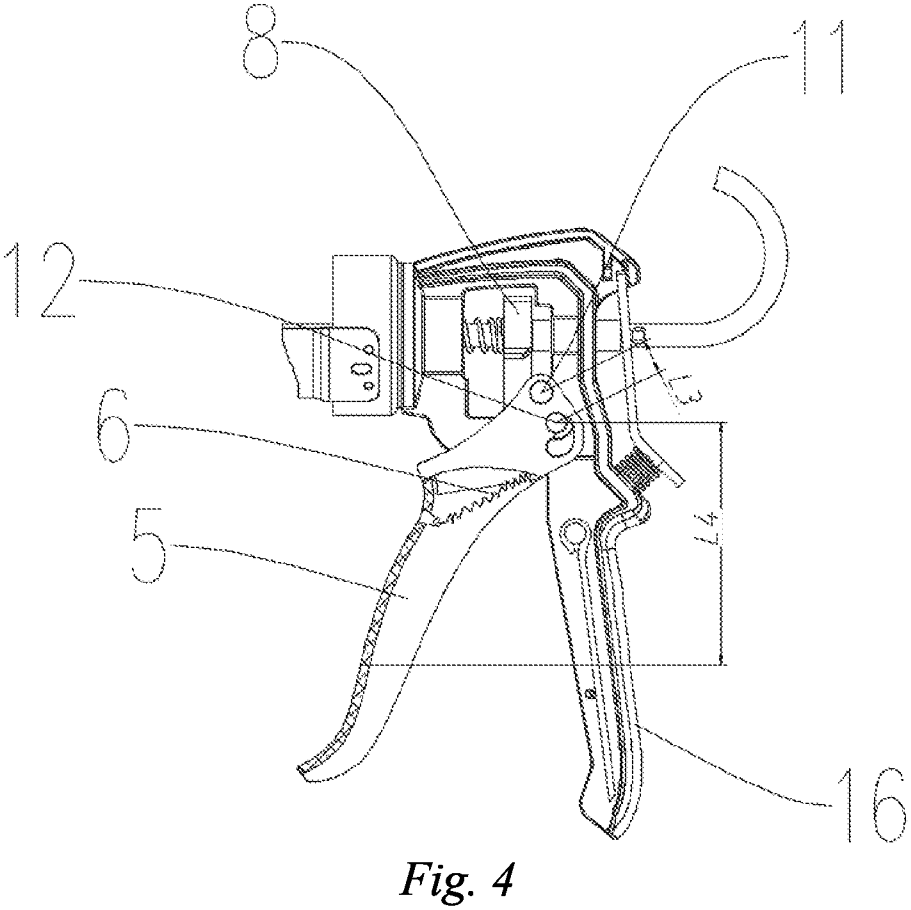
FIG. 4 is a schematic diagram of a second gear in FIG. 1.
Figure 5:
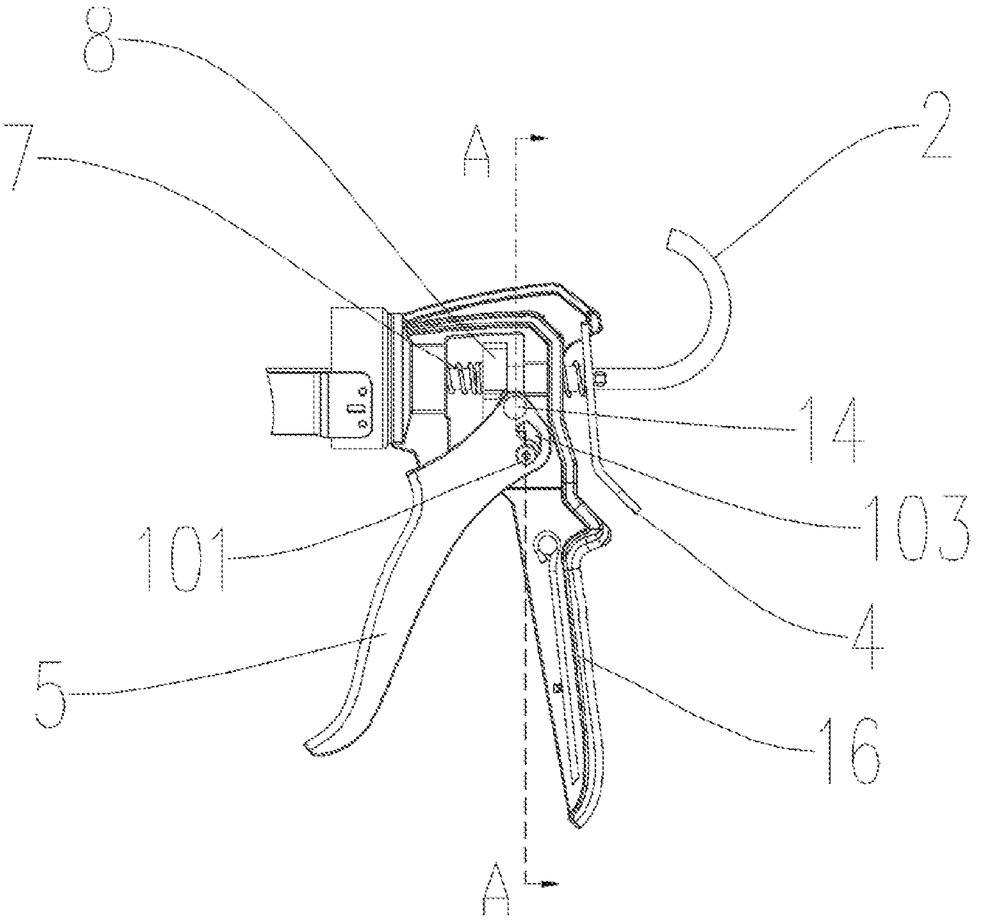
FIG. 5 is a schematic diagram showing the structure of a glue gun according to Embodiment 2 of the present invention.
Figure 6:
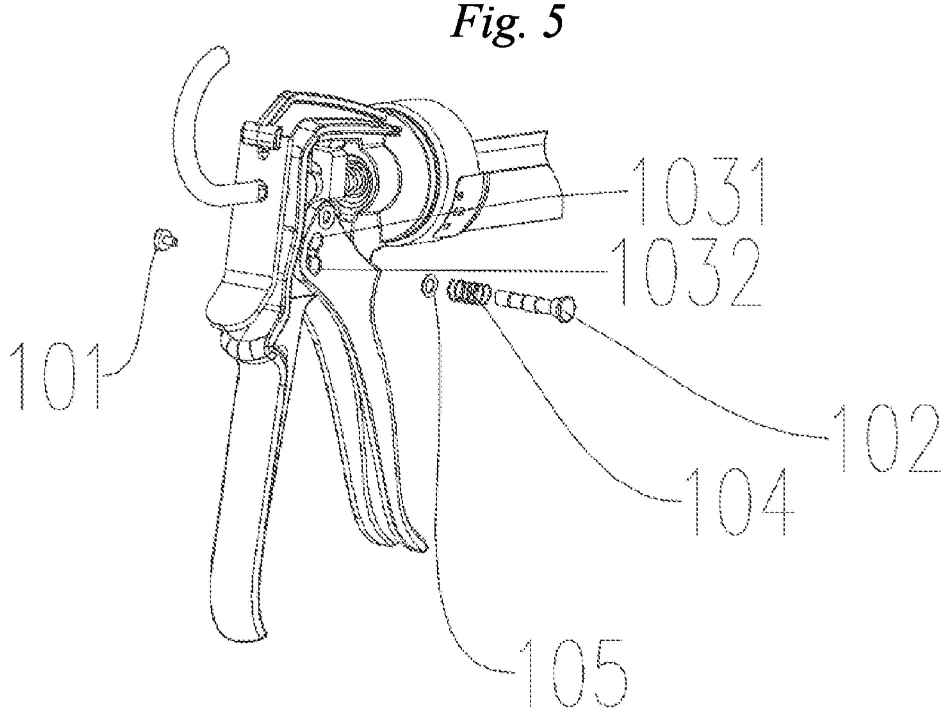
FIG. 6 is an exploded schematic diagram showing a partial structure of the glue gun in FIG. 5.
Figure 7:
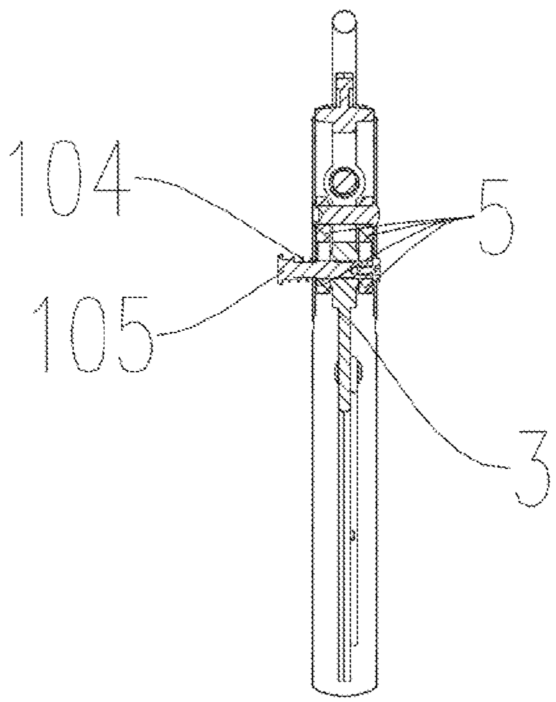
FIG. 7 is an A-A section view of the glue gun in FIG. 5.
Figure 8:
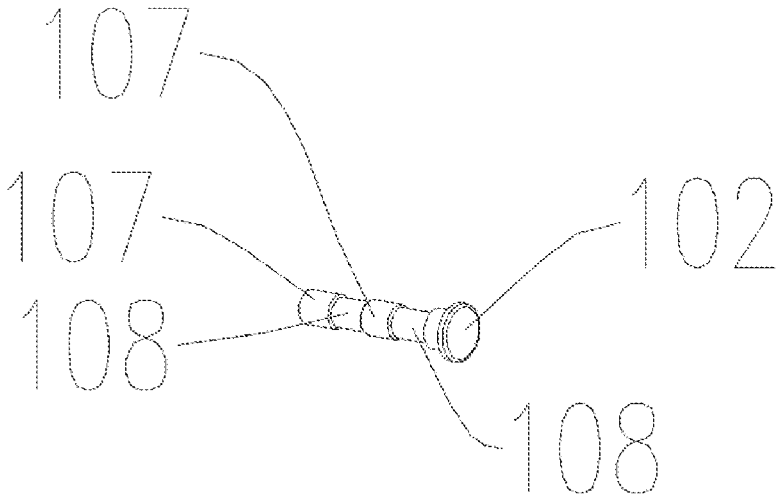
FIG. 8 is a schematic diagram showing the structure of a stepped pin shaft in the FIG. 5.

FIGS. 3 and 4 show the variation of the spacing between the pivot pin shaft 12 and the actuating member 11 in different gears. When the pivot pin shaft 12 is in the first gear 131, the spacing between the pivot pin shaft 12 and the actuating member 11 is set as L1. Here, the spacing refers to a distance between the axis of the pivot pin shaft 12 and the axis of the actuating member 11 (In FIGS. 3 and 4, the axis of the pivot pin shaft 12 and the axis of the actuating member 11 are both perpendicular to the plane of the paper and facing outward, that is, on a side surface 51 of the movable handle 5, indicating a distance between the center of the circle of the pivot pin shaft 12 and the center of the circle of the actuating member 11). The vertical spacing between the pivot pin shaft 12 and the force applied on the movable handle 5 is set as L2. This vertical spacing refers to a distance between the axis of the pivot pin shaft 12 and a force application point 52 on the movable handle 5 in a vertical direction Y. When the pivot pin shaft 12 is in the second gear 132, the spacing between the pivot pin shaft 12 and the actuating member 11 is set as L3, and the vertical spacing between the pivot pin shaft 12 and the force applied on the movable handle 5 is set as L4. L1>L3, and L2<L4. When in the first gear 131, the pushing force generated by applying the same force at the movable handle 5 is smaller than that in the second gear 132, and the pushing course is greater than that in the second gear 132. When the movable handle 5 is pulled outwards, the tension spring 6 is lengthened due to the outward pulling force, and the pivot pin shaft 12 will be shifted in the sliding groove 13 to adapt to fluid with a different fluidity. By changing the gear of the pivot pin shaft 12, the spacing between the pivot pin shaft 12 and the actuating member 11 is changed, and the vertical spacing between the pivot pin shaft 12 and the force application point 52 on the movable handle 5 is changed, such that the thrust acting on the push member 8 by the actuating member 11 is different, so as to change the pushing course of the push rod 2, so it can adapt to fluid with a different fluidity. In other words, in this embodiment, by adjusting the ratio of the spacing between the pivot pin shaft 12 and the force application point 52 to the spacing between the pivot pin shaft 12 and a force bearing point (i.e., a point where the actuating member 11 contacts the push member), the adjustment of the force applied on the push member and the switching between transmission rates (i.e., speeds at which the push rod is pushed) are realized.

In other embodiments, the sliding groove 13 may be provided on the fixed handle 16, and the sliding groove 13 is provided with two or more gears. The pivot pin shaft 12 is arranged to be slidable in the sliding groove 13 so as to enable switching between the gears 131 and 132.

Embodiment 2

Figure 9:
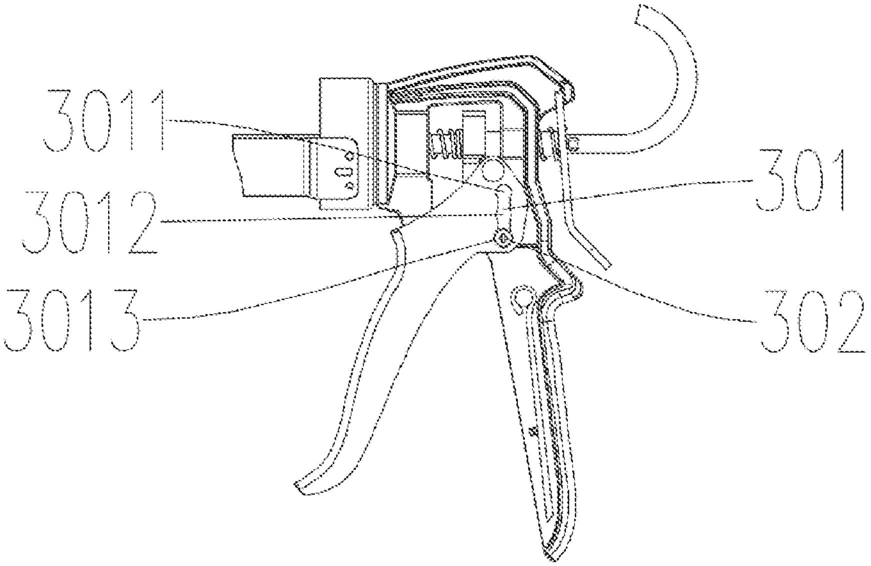
FIG. 9 is a schematic diagram showing the structure of a linear sliding groove in FIG. 5.

In other embodiments, as shown in FIGS. 5-9, the tension spring 6 between the movable handle 5 and the fixed handle 16 is removed. The pivot pin shaft 12 is provided as a stepped pin shaft 102, and the stepped pin shaft 102 has a pressing end and an end fixed to a screw 101. The pressing end is sheathed with a spring 104 and a spacer 105. The stepped pin shaft 102 has a first shaft diameter portion 107 and a second shaft diameter portion 108 (see FIG. 8). The sliding groove 103 has a first gear 1031 and a second gear 1032. The first gear 1031 and the second gear 1032 may be respectively located at two end portions of the sliding groove 103. The widths of the sliding groove 103 at the first gear 1031 and the second gear 1032 are greater than the width of other part (i.e., a middle portion connecting the first gear 1031 and the second gear 1032) of the sliding groove 103. The stepped pin shaft 102 may slide in the sliding groove 103, so as to move to the first gear 1031 or the second gear 1032. The shaft diameter of the first shaft diameter portion 107 is greater than the width of the middle portion of the sliding groove 103, and the shaft diameter of the second shaft diameter portion 108 is smaller than the width of the sliding groove 103. Under the biasing action of the spring 104, the first shaft diameter portion 107 is in the gear 1031 or 1032, and when the pressing end is pressed, the stepped pin shaft 102 moves axially such that the second shaft diameter portion 108 goes into the gear 1031 or 1032, and at the same time, the shaft diameter of the second shaft diameter portion 108 is smaller than the width of the sliding groove 103, such that the stepped pin shaft 102 may be moved to slide along the sliding groove 103, thus making the stepped pin shaft 102 move from one gear to another for gear switching. When the pressing end is released, the stepped pin shaft 102 moves axially in the opposite direction under the action of a restoring force of a spring 104, such that the first shaft diameter portion 107 goes into the current gear again. Since the shaft diameter of the first shaft diameter portion 107 is greater than the width of the sliding groove 103, the stepped pin shaft 102 is fixed at the current position of the sliding groove 103, thereby fixing the stepped pin shaft 102 in the current gear. Preferably, as shown in FIG. 9, the sliding groove 301 is linear and has multiple gears 3011, 3012 and 3013. The widths of the sliding groove 301 at the gears are greater than the widths of other parts (i.e. parts between adjacent gears). The stepped pin shaft 302 slides in the sliding groove 301 to realize the switching between the gears. In this embodiment, by changing the position of the stepped pin shaft in the sliding groove, the stepped pin shaft can be in different gears. In this case, the spacing between the stepped pin shaft and the actuating member 11 is changed, so the vertical spacing between the stepped pin shaft and the force application point on the movable handle 5 is changed, such that the thrust acting on the push member 8 by the actuating member 11 is different, so as to change the pushing course of the push rod 2, so it can adapt to fluid with a different fluidity. In other words, in this embodiment, by adjusting the ratio of the spacing between the stepped pin shaft and a force application point to the spacing between the stepped pin shaft and a force bearing point (i.e., a point where the actuating member 11 contacts the push member), the adjustment of the force applied on the push member and the switching between transmission rates (i.e., speeds at which the push rod is pushed) are realized.

Embodiment 3

Figure 10:
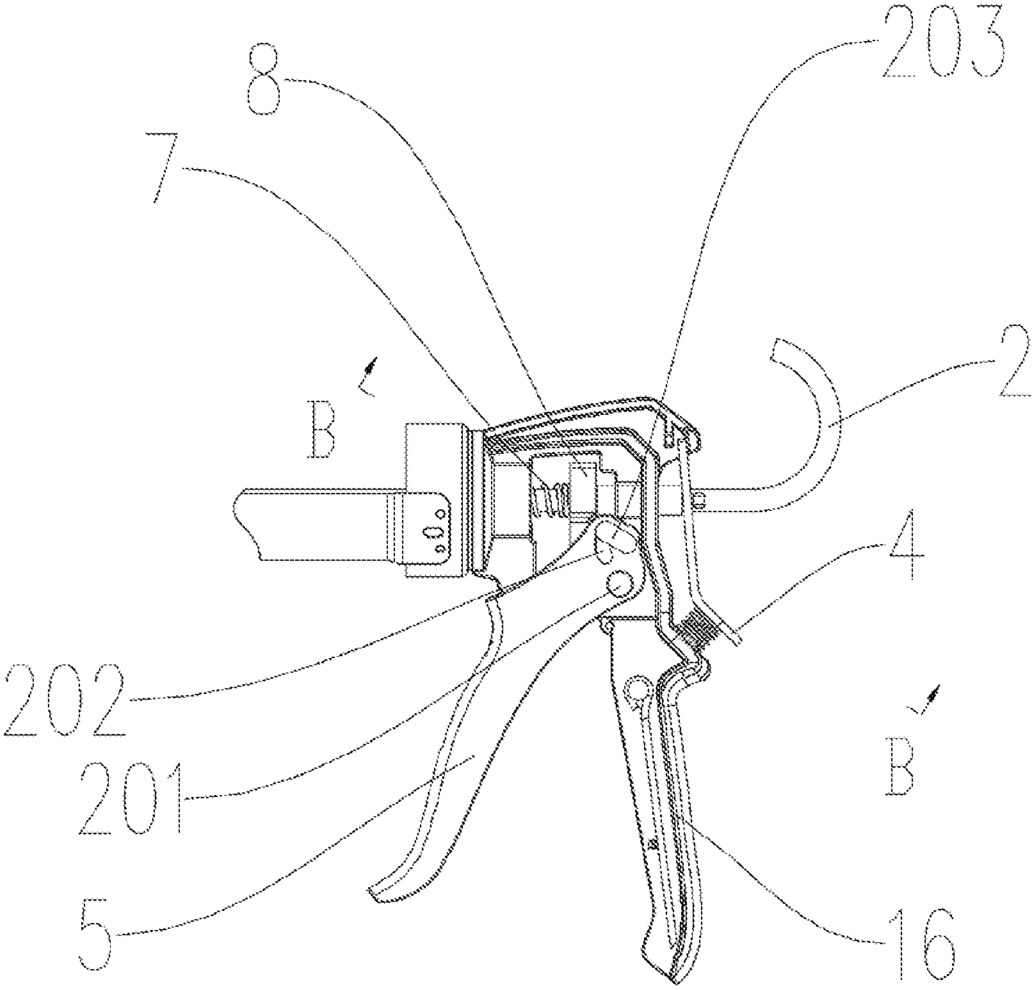
FIG. 10 is a schematic diagram showing the structure of a glue gun according to Embodiment 3 of the present invention.
Figure 11:
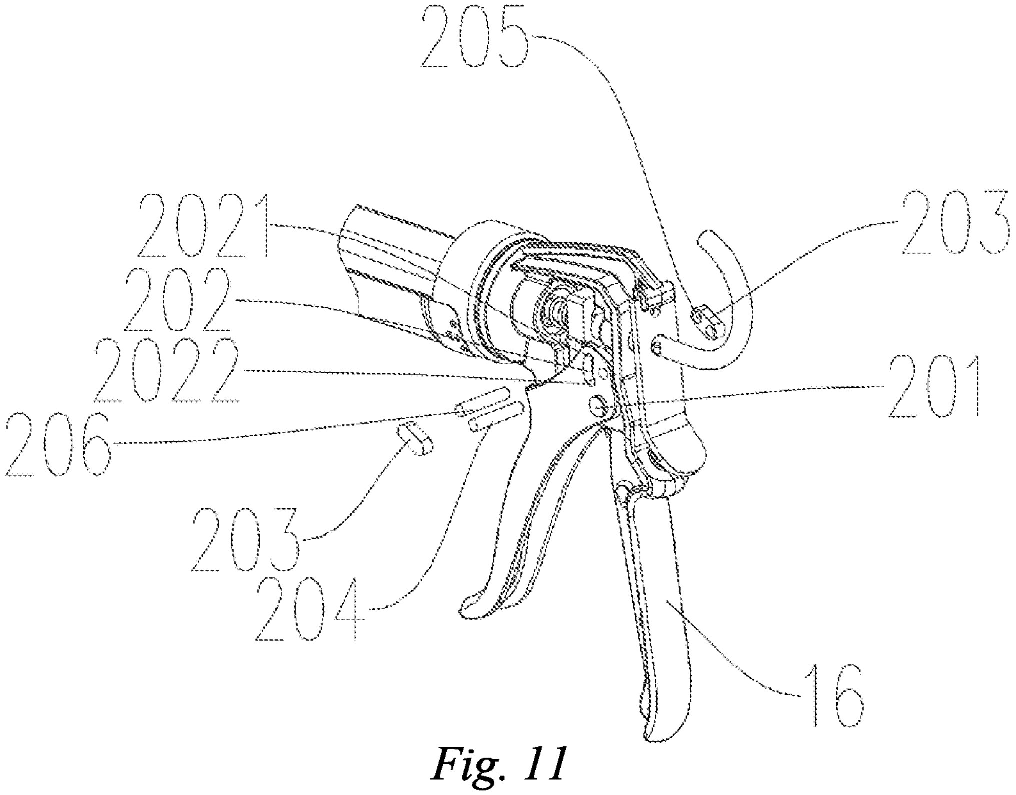
FIG. 11 is a schematic diagram showing a partial structure in FIG. 10.
Figure 12:
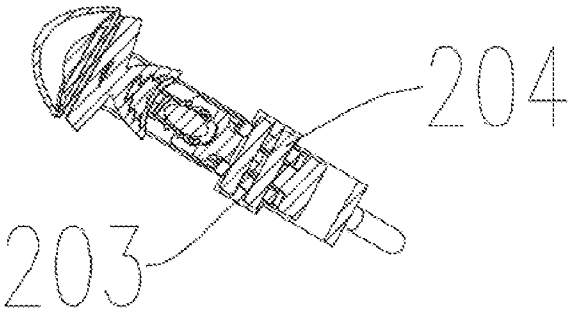
FIG. 12 is a section view of an actuating member in FIG. 10.

FIGS. 10-12 show another preferred embodiment of the present invention. The movable handle 5 is hinged to the fixed handle 16 by means of a pivot pin shaft 201. The movable handle 5 is further provided with a sliding groove 202. The actuating member further includes a pivot 204 and an actuating part 206 in contact with the push member 8. The actuating part 206 is arranged to be slidable in the sliding groove 202 around the pivot 204. The sliding groove 202 has a first gear 2021 and a second gear 2022. The first gear 2021 and the second gear 2022 may be respectively located at two ends of the sliding groove 202. A shift member 203 is connected to the pivot 204 and the actuating part 206, and the actuating part 206 slides between two ends of the sliding groove 202 by means of the shift member 203, i.e. realizing the changes in the position where the actuating part 206 makes contact with the push member 8 to achieve switching between the gears 2021 and 2022. When the actuating part 206 is in different gears, the spacing between the actuating part 206 and the pivot pin shaft 201 is different, and the vertical spacing between the pivot pin shaft 201 and a force application point on the movable handle 5 is different, such that the thrust acting on the push member 8 by the actuating part 206 is different, so as to change the pushing course of the push rod 2, so it can adapt to fluid with a different fluidity. In Embodiment 1 and Embodiment 2, by changing the gear of the pivot pin shaft, the purpose of changing the spacing between the pivot pin shaft and the actuating member is achieved; while in this embodiment, the change in the spacing between the actuating part and the pivot pin shaft is achieved by changing the gear of the actuating part 206. In other words, in this embodiment, by adjusting the ratio of the spacing between the pivot pin shaft 201 and a force application point to the spacing between the pivot pin shaft 201 and a force bearing point (i.e., a point where the actuating part 206 contacts the push member 8), the adjustment of the force applied on the push member and the switching between transmission rates (i.e., speeds at which the push rod is pushed) are realized.

Embodiment 4

Figure 13:
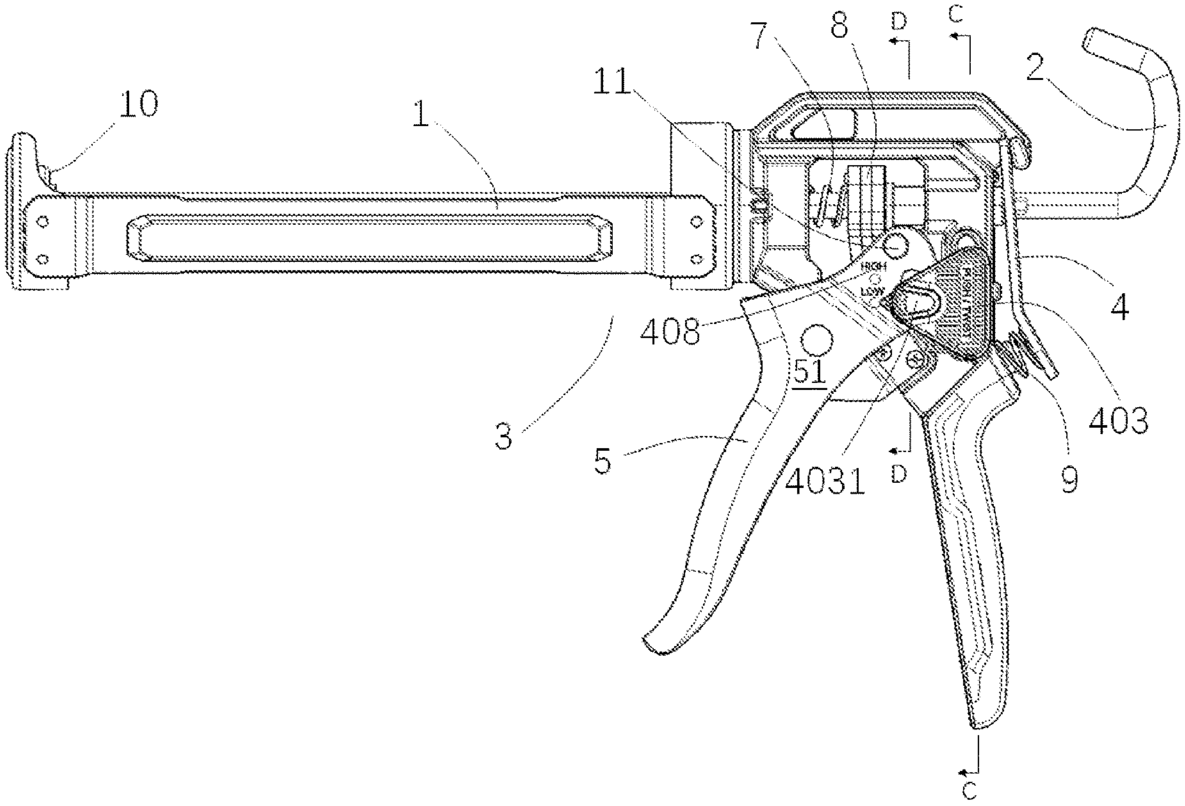
FIG. 13 is a schematic diagram showing the structure of a glue gun according to Embodiment 4 of the present invention.
Figure 14:
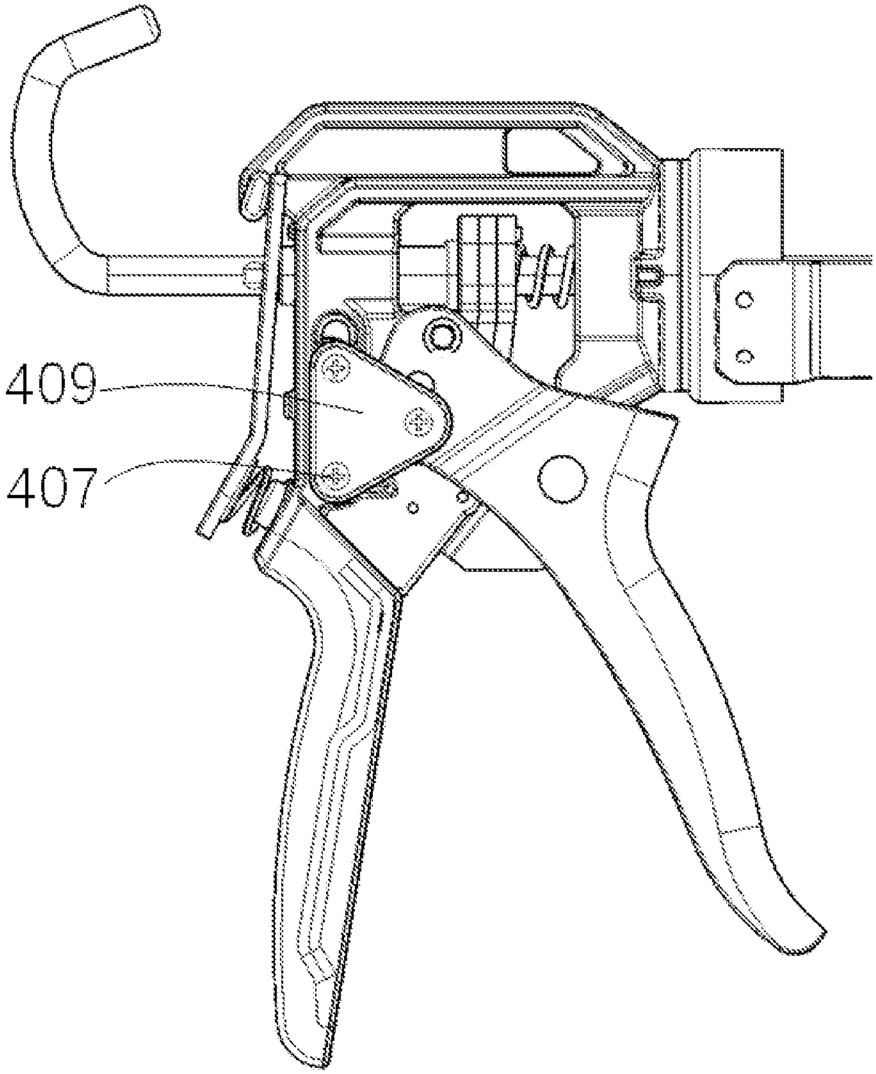
FIG. 14 is a rear view of the part of FIG. 13.

FIGS. 13-19 show another preferred embodiment of the present invention. Referring to FIG. 13, most features of this embodiment are the same as those of Embodiment 1. For example, components such as the push member 8, the push rod 2, the push body 10, the main body 3, the accommodation part 1, the brake 4, the movable handle 5, the restoring spring 7, the compression spring 9, the actuating member 11 and the fixed handle 16, and their connection modes are the same as those in Embodiment 1, which will not be repeated here. This embodiment is different from Embodiment 1 in that the way of shifting gears of the pivot pin shaft is different.

Figure 15:
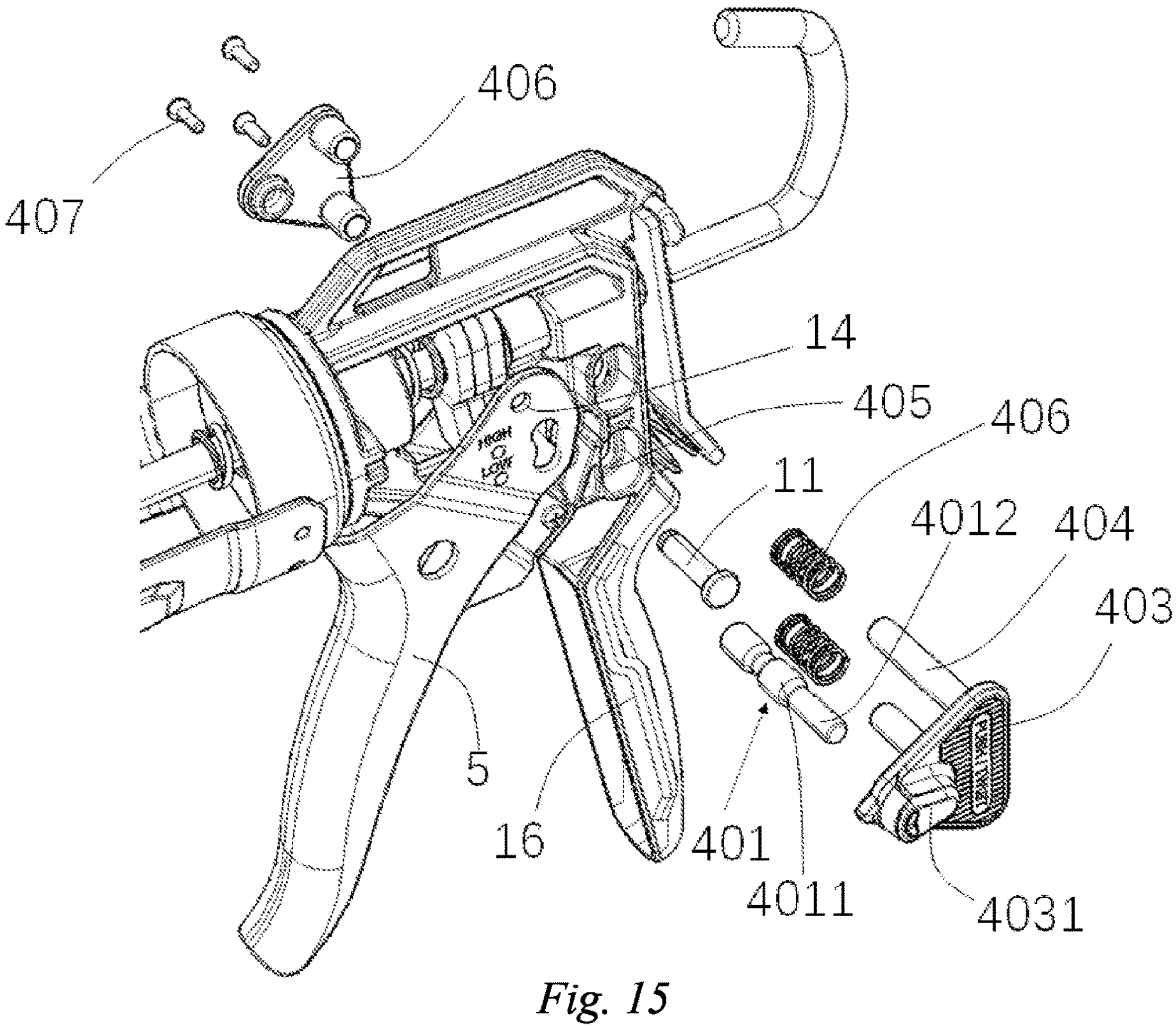
FIG. 15 is an exploded schematic diagram of FIG. 13.
Figure 16:
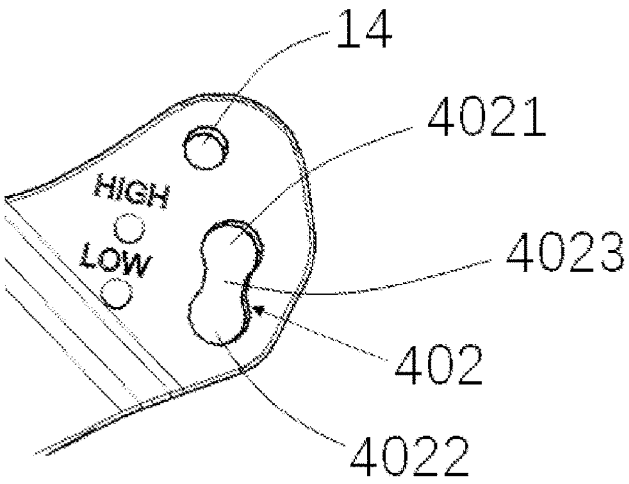
FIG. 16 is a partial enlarged view of FIG. 13.
Figure 17:
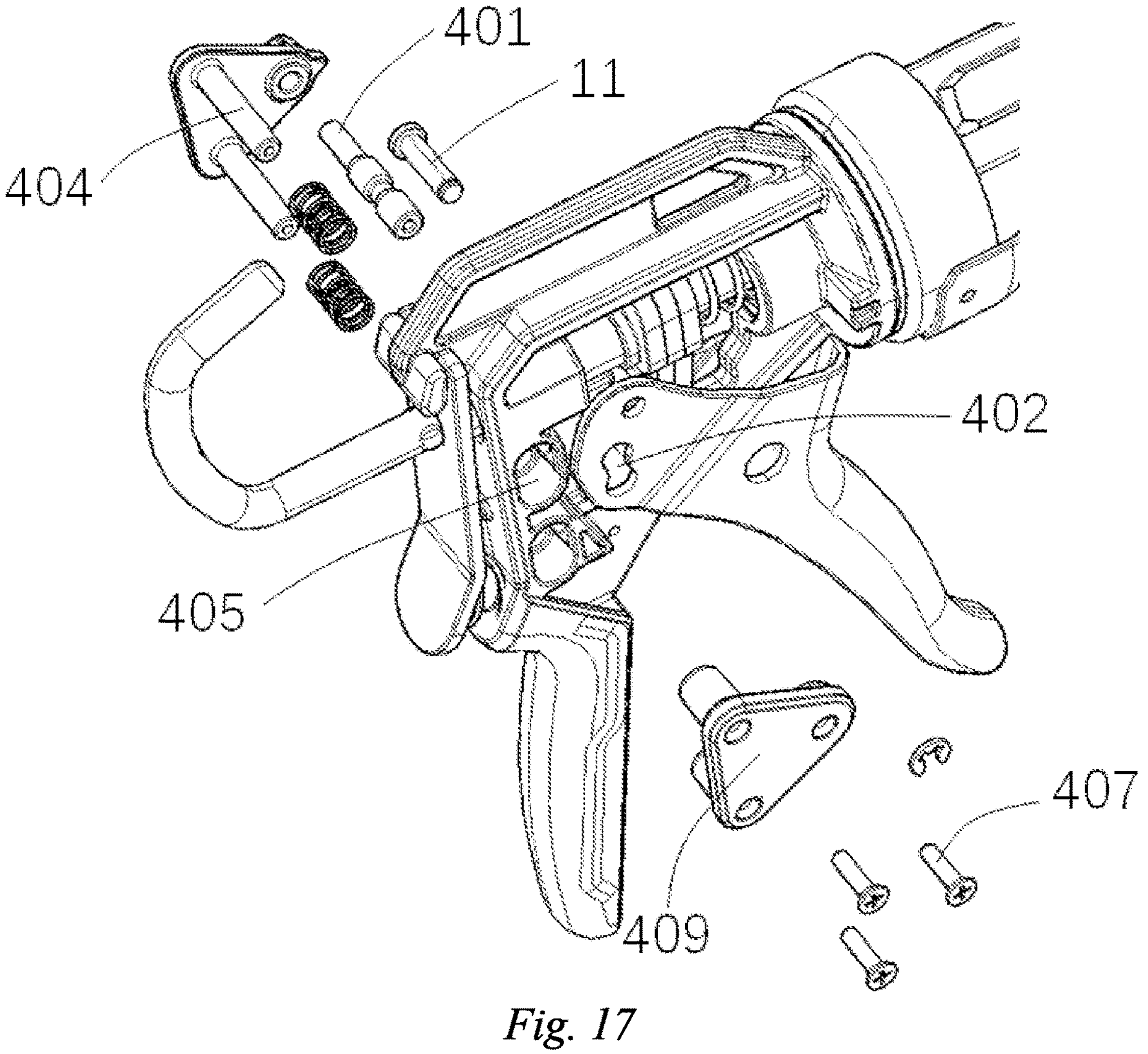
FIG. 17 is a schematic diagram from another perspective of FIG. 15.
Figure 18:
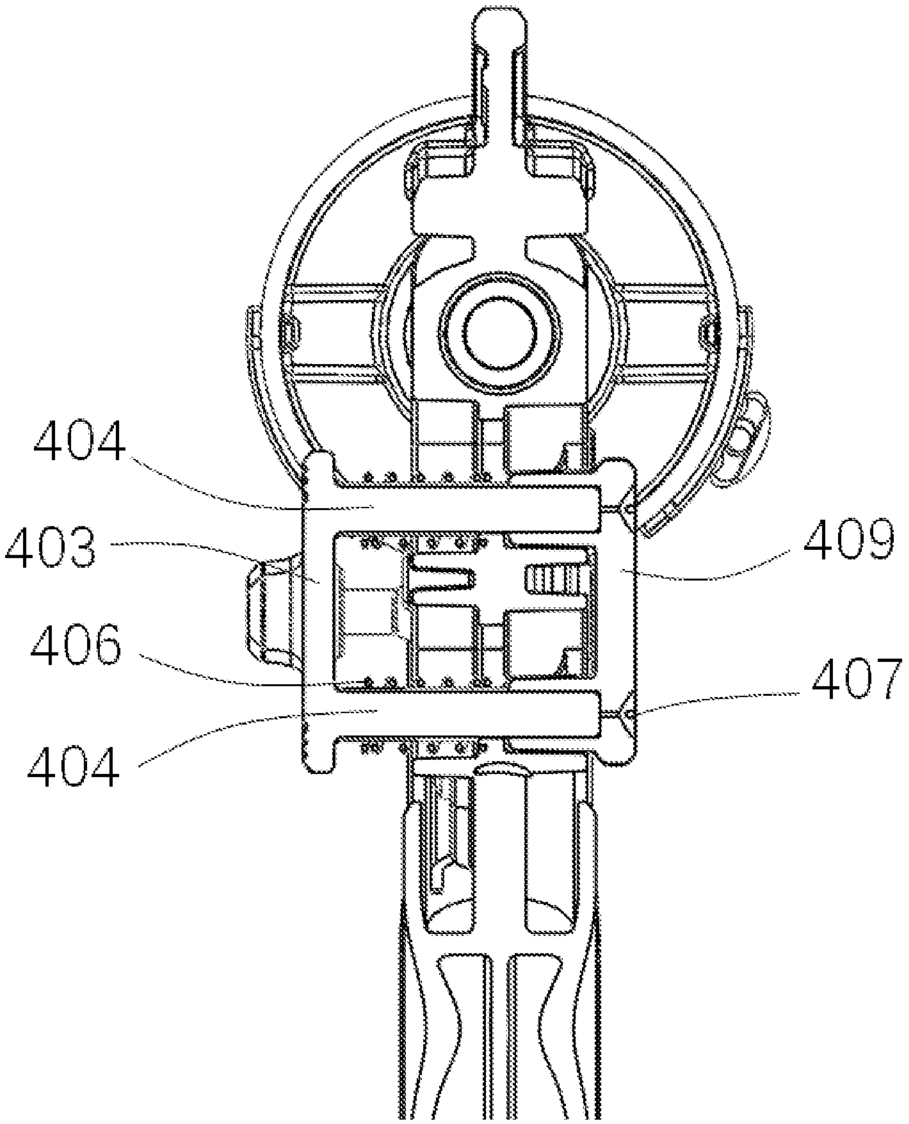
FIG. 18 is a C-C section view of FIG. 15.
Figure 19:
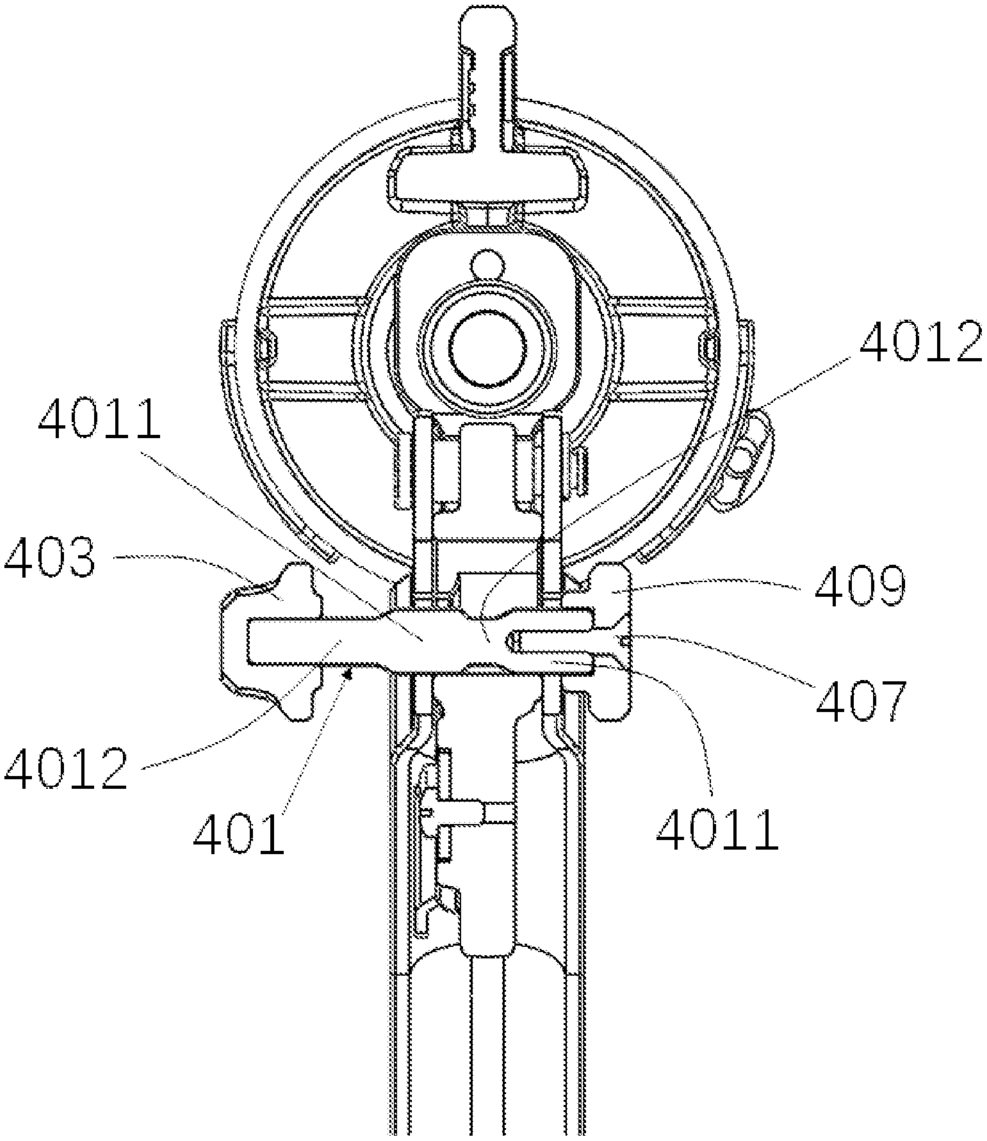
FIG. 19 is a D-D section view of FIG. 15.

Referring to FIG. 15, in this embodiment, the actuating member 11 passes through a hole 14 in the movable handle 5 and makes contact with the push member 8 to drive the push member 8, so as to move the push rod 2. The movable handle 5 is connected to the fixed handle 16 via a pivot pin shaft 401. When a force is applied to the movable handle 5, the movable handle 5 can rotate around the pivot pin shaft 401 relative to the fixed handle 16. The movable handle 5 is provided with a sliding groove 402. Referring to FIG. 16, the sliding groove 402 has a first gear 4021 and a second gear 4022. The first gear 4021 and the second gear 4022 can be respectively arranged at both ends of the sliding groove 402, that is, holes are formed at both ends of the sliding groove 402 as the first gear 4021 and the second gear 4022, and the two holes communicate with each other to form a communication portion 4023, thus forming the sliding groove 402, where the diameter of the holes is greater than the width of the communication portion 4023. The pivot pin shaft 401 can slide in the sliding groove 402 to move to the first gear 4021 or the second gear 4022. Referring to FIGS. 15 and 19, the pivot pin shaft 401 is of a stepped pin shaft structure, including a first shaft diameter portion 4011 and a second shaft diameter portion 4012. The shaft diameter of the first shaft diameter portion 4011 is greater than the width of the communication portion 4023 of the sliding groove 402, and the shaft diameter of the second shaft diameter portion 4012 is smaller than the width of the communication portion 4023 of the sliding groove 402. When the first shaft diameter portion 4011 is in the first gear 4021 or the second gear 4022 of the sliding groove 402, the pivot pin shaft 401 cannot slide along the sliding groove 402, thus keeping the pivot pin shaft 401 in the current gear. When the second shaft diameter portion 4012 is located in the sliding groove 402, since the shaft diameter of the second shaft diameter portion 4012 is smaller than the width of the sliding groove 402, the fixing of the pivot pin shaft 401 can be released, such that the pivot pin shaft 401 can slide along the sliding groove 402 under the action of an external force to switch gears.

Referring to FIGS. 15 and 17-19, one end of the pivot pin shaft 401 is connected to a pressing portion 403, the pressing portion 403 is further provided with at least one positioning pin 404, the axial direction of the positioning pin 404 is parallel to the axial direction of the pivot pin shaft 401, the fixed handle 16 is provided with at least one positioning groove 405, one positioning pin 404 passes through one positioning groove 405, and the positioning pin 404 can slide along the positioning groove 405 in the same sliding direction as that of the pivot pin shaft 401 in the sliding groove 402. The positioning pin 404 is sheathed with a spring 406. When the pressing portion 403 is pressed, the pivot pin shaft 401 and the positioning pin 404 both move along their respective axial directions, the second shaft diameter portion 4012 of the pivot pin shaft 401 moves into the sliding groove 402, and the spring 406 over the positioning pin 404 is compressed. Then the pressing portion 403 is driven to move along the length direction of the sliding groove 402, the pivot pin shaft 401 slides in the sliding groove 402, and the positioning pin 404 slides in the positioning groove 405. When the pivot pin shaft 401 is switched to a preset gear, the pressing portion 403 is released, and under the biasing action of the spring 406, the pressing portion 403 is restored, and both the pivot pin shaft 401 and the positioning pin 404 move along with the pressing portion 403. At this time, the first shaft diameter portion 4011 of the pivot pin shaft 401 moves to the gear 4021 or 4022 of the sliding groove 402, so that the pivot pin shaft 401 is kept in the current gear.

Preferably, the number of the positioning pins 404 are two. Accordingly, the fixed handle 16 is provided with two positioning grooves 405 corresponding to the positioning pins 404, each positioning pin 404 being sheathed with a spring 406. The two positioning pins 404 and the pivot pin shaft 401 form a triangle, where the two positioning pins 404 may be on a same straight line, the direction of which may be the same as the length directions of the positioning grooves 405. The shape of the pressing portion 403 may be substantially triangular.

A blocking piece 409 is provided on a side opposite the pressing portion 403, and the other ends of the pivot pin shaft 401 and the positioning pins 404 are all connected to the blocking piece 409 by fasteners 407 such as screws.

Marks 408 are provided on the movable handle 5 to indicate that the pivot pin shaft 401 is in different gears. A boss 4031 is provided on an outer surface of the pressing portion 403, which is convenient for a user to operate the pressing portion 403 to press the pressing portion 403 and push the pressing portion 403.

Similar to Embodiments 1-3, in this embodiment, when the pivot pin shaft 401 is in different gears in the sliding groove 402, the spacing between the pivot pin shaft 401 and the actuating member 11 (i.e., the distance between the axis of the pivot pin shaft 401 and the axis of the actuating member 11 on a side surface 51 of the movable handle 5) is different, and the vertical spacing between the pivot pin shaft 401 and a force application point 52 on the movable handle 5 is different, such that the contact position of the actuating member 11 and the push member 8 is different and the thrust acting on the push member 8 is different, so as to change the pushing course of the push rod 2, so it can adapt to fluid with a different fluidity. In other words, in this embodiment, by adjusting the ratio of the spacing between the pivot pin shaft 401 and a force application point to the spacing between the pivot pin shaft 401 and a force bearing point (i.e., a point where the actuating member 11 contacts the push member), the adjustment of the force applied on the push member and the switching between transmission rates (i.e., speeds at which the push rod is pushed) are realized.

The specific preferred embodiments of the present invention are described in detail above. It should be appreciated that a person skilled in the art could make modifications and variations in accordance with the concept of the present invention without involving any inventive effort. Therefore, all technical solutions that can be obtained by those skilled in the art through logical analysis, reasoning or limited experiments according to the concept of the present invention on the basis of the prior art should fall within the scope of protection defined by the claims.

The invention claimed is:

1. A glue gun, comprising:

a first handle and a second handle, wherein the first handle is connected to the second handle via a pivot pin shaft; one of the first handle and the second handle is arranged as a fixed handle, and the other one is arranged as a movable handle rotating relative to the fixed handle;

the movable handle is provided with an actuating member, and the actuating member is configured to push a push member of the glue gun; and at least one of the actuating member and the pivot pin shaft is arranged to be adjustable in position so as to switch between at least two gears, so that a ratio of a spacing between the pivot pin shaft and a force application point on the movable handle to a spacing between the pivot pin shaft and a force bearing point on the actuating member is changed, thus enabling a change in a force applied on the push member as well as a change in a rate of movement of a push rod.

2. The glue gun of claim 1, wherein a spacing between an axis of the actuating member and an axis of the pivot pin shaft is sized to be adjustable, such that the pivot pin shaft or the actuating member can switch between the at least two gears.

3. The glue gun of claim 2, wherein one of the first handle and the second handle is provided with a sliding groove, which is provided with the at least two gears; and the pivot pin shaft is arranged to be slidable in the sliding groove so as to enable switching between the gears.

4. The glue gun of claim 3, wherein a first elastic component is further provided between the first handle and the second handle; and the first elastic component is arranged to produce a pre-tightening force on one of the first handle and the second handle which is arranged as the movable handle so as to keep the pivot pin shaft in one of the gears.

5. The glue gun of claim 3, wherein the pivot pin shaft is a stepped pin shaft, the stepped pin shaft has a first shaft diameter portion and a second shaft diameter portion, widths of the sliding groove at the gears are greater than a width of a communication portion of the sliding groove which communicates the gears; a shaft diameter of the first shaft diameter portion is greater than the width of the communication portion, and a shaft diameter of the second shaft diameter portion is smaller than the width of the communication portion; and the stepped pin shaft is configured such that: the stepped pin shaft moves axially under an action of an external force, and when the first shaft diameter portion is in one gear of the gears, the stepped pin shaft is kept in the gear, and when the second shaft diameter portion is in the gear, the stepped pin shaft can slide along the sliding groove.

6. The glue gun of claim 5, wherein the stepped pin shaft has a pressing end, the pressing end is sheathed with a second elastic component, and the stepped pin shaft is configured such that: under a biasing action of the second elastic component, the first shaft diameter portion is in the gear; when the pressing end is pressed, the stepped pin shaft moves axially such that the second shaft diameter portion goes into the gear; and when the pressing end is released, the stepped pin shaft moves axially in an opposite direction under the action of a restoring force of the second elastic component such that the first shaft diameter portion goes into the gear again.

7. The glue gun of claim 5, wherein one end of the stepped pin shaft is connected to a pressing portion, the pressing portion is provided with at least one positioning pin, and an axial direction of the positioning pin is parallel to an axial direction of the stepped pin shaft; the sliding groove is provided on the first handle, the second handle is provided with at least one positioning groove, and the positioning pin passes through the positioning groove and is configured to slide in the positioning groove; the positioning pin is sheathed with a third elastic component, wherein the stepped pin shaft and the positioning pin are configured to move along with the pressing portion, and under a biasing action of the third elastic component, the first shaft diameter portion is in the gear; when the pressing portion is pressed, the stepped pin shaft and the positioning pin move axially such that the second shaft diameter portion goes into the gear; and when the pressing end is released, the positioning pin and the stepped pin shaft move axially in an opposite direction under the action of a restoring force of the third elastic component such that the first shaft diameter portion goes into the gear again.

8. The glue gun of claim 7, wherein the glue gun further comprises a blocking piece arranged opposite the pressing portion, and other ends of the stepped pin shaft and the positioning pin are connected to the blocking piece by fasteners.

9. The glue gun of claim 7, wherein the pressing portion is provided with a first positioning pin and a second positioning pin, and the second handle is provided with a first positioning groove corresponding to the first positioning pin and a second positioning groove corresponding to the second positioning pin.

10. The glue gun of claim 9, wherein the first positioning pin, the second positioning pin and the stepped pin shaft are distributed in a triangle shape.

11. The glue gun of claim 10, wherein the first positioning pin and the second positioning pin are on a same straight line.

12. The glue gun of claim 7, wherein a boss is provided on an outer surface of the pressing portion.

13. The glue gun of claim 5, wherein the sliding groove is an arc-shaped groove or a linear groove.

14. The glue gun of claim 1, wherein the first handle is provided with a sliding groove, which is provided with the at least two gears; and an actuating part of the actuating member is arranged to be slidable in the sliding groove so as to enable switching between the gears.

15. The glue gun of claim 14, wherein the actuating member further comprises a pivot, and the actuating part on the actuating member is arranged to be slidable in the sliding groove around the pivot.

16. The glue gun of claim 1, further comprising:

a brake sheathed on a push rod of the glue gun, wherein a compression spring is provided between the brake and a main body of the glue gun, and the brake is configured to retain the push rod under a push of the compression spring, so that the push rod can only move in a direction of glue flowing out.

17. The glue gun of claim 16, wherein the main body is provided with a limiting groove, and one end of the brake is positioned in the limiting groove; and the limiting groove has a first limiting end and a second limiting end, and the brake is configured to move between the first limiting end and the second limiting end, so that the push rod has an idle stroke, with a distance being that from the first limiting end to the second limiting end, in a pushing process.

18. The glue gun of claim 17, wherein the idle stroke is 3-5 mm.

19. A glue gun, comprising:

a trigger device comprising a movable handle and a fixed handle which are connected via a pivot pin shaft;

a main body with one end formed as an accommodation part for accommodating glue and an other end connected to the fixed handle;

a push rod with one end provided with a push body positioned in the accommodation part and the other end sheathed with a push member, wherein the push body is arranged to reciprocate along with the push rod;

an actuating member provided on the movable handle and configured to push the push member; and a brake sheathed on the push rod, wherein a compression spring is provided between the brake and the main body, and the brake is configured to retain the push rod under a push of the compression spring, so that the push rod can only move in a direction of the glue flowing out, wherein a spacing between the actuating member and the pivot pin shaft is sized to be adjustable to make the glue gun switch between at least two gears, so that a ratio of a spacing between the pivot pin shaft and a force application point on the movable handle to a spacing between the pivot pin shaft and a force bearing point on the actuating member is changed, thus enabling a change in a force applied on the push member as well as a change in a rate of movement of the push rod.

20. The glue gun of claim 19, wherein the movable handle has a sliding groove, and the sliding groove has a first gear and a second gear; the actuating member is configured to slide in the sliding groove so as to switch between the first gear and the second gear; or the pivot pin shaft is configured to slide in the sliding groove so as to switch between the first gear and the second gear.

* * * * *